United States Patent [19]
Umeda et al.

[11] Patent Number: 5,920,817
[45] Date of Patent: Jul. 6, 1999

[54] MOBILE COMMUNICATION SYSTEM WITH RELIABLE HANDOVER SCHEME

[75] Inventors: Narumi Umeda; Takehiro Nakamura; Kouji Ohno; Noriteru Shinagawa, all of Kanagawaken, Japan

[73] Assignee: NTT Mobile Communications Network Inc., Tokyo, Japan

[21] Appl. No.: 08/578,537

[22] PCT Filed: May 19, 1995

[86] PCT No.: PCT/JP95/00967

§ 371 Date: Mar. 22, 1996

§ 102(e) Date: Mar. 22, 1996

[87] PCT Pub. No.: WO95/32594

PCT Pub. Date: Nov. 30, 1995

[30] Foreign Application Priority Data

May 20, 1994 [JP] Japan .................................... 6-106953
Sep. 2, 1994 [JP] Japan .................................... 6-210193

[51] Int. Cl.⁶ .................................................... H04Q 7/00
[52] U.S. Cl. ............................................. 455/437; 370/331
[58] Field of Search ................................ 455/33.2, 33.3, 455/56.1, 54.1, 437, 436, 438, 440; 370/331, 332; 379/60

[56] References Cited

U.S. PATENT DOCUMENTS

| | | | |
|---|---|---|---|
| 4,556,760 | 12/1985 | Goldman | 455/436 |
| 4,759,051 | 7/1988 | Han | 455/437 |
| 4,926,421 | 5/1990 | Kawano et al. | 455/437 X |
| 5,031,193 | 7/1991 | Atkinson et al. | 375/231 |
| 5,109,390 | 4/1992 | Gilhousen et al. | 370/335 |
| 5,193,102 | 3/1993 | Meidan et al. | 375/202 |
| 5,278,892 | 1/1994 | Bolliger et al. | 379/60 |
| 5,293,380 | 3/1994 | Kondo | 455/33.2 X |

FOREIGN PATENT DOCUMENTS

| | | |
|---|---|---|
| 0430481 | 6/1991 | European Pat. Off. . |
| 0522773 | 1/1993 | European Pat. Off. . |
| 0643542 | 3/1995 | European Pat. Off. . |
| 292 063 | 11/1993 | Japan . |
| 268 576 | 9/1994 | Japan . |
| 9107036 | 5/1991 | WIPO . |

*Primary Examiner*—Thomas Mullen
*Attorney, Agent, or Firm*—Oblon, Spivak, McClelland, Maier & Neustadt, P.C.

[57] ABSTRACT

A mobile communication scheme realizing highly reliable handover and improved service quality. The communication signals containing identical communication data are transmitted simultaneously from the mobile station to more than one base stations at a time of the handover, such that reception signals are composed from the communication signals received by more than one base stations by using the reliability information for the received communication signals. For the packet communication, the identification information for identifying each packet is attached to each packet, and the reliability information for each packet is measured, such that the reception packets can be obtained according to the identification information attached to each packet and the reliability information measured for each packet.

23 Claims, 12 Drawing Sheets

MOBILE COMMUNICATION SYSTEM WITH RELIABLE HANDOVER SCHEME

BACKGROUND OF THE INVENTION

1. Field of the Invention

The present invention relates to a mobile communication system with a service area covered by a plurality of cells in which a communication of a mobile station is realized by sequentially switching the cells in communication with the mobile station according to the movement of the mobile station.

2. Description of the Background Art

In a mobile communication system having a service area covered by a plurality of cells with base stations provided therein, in order for a mobile station which is moving through the service area to make a continuous communication, it is necessary to carry out the handover procedure for sequentially switching the base stations in communication with the mobile station according to the movement of the mobile station.

Conventionally, this handover procedure has been carried out as illustrated by the sequence chart of FIG. 1 for an exemplary case in which a mobile station MS is initially in communication with a base station BS1 through a channel ch1 (S0). When the mobile station MS detects the cell transition from a cell of the base station BS1 to a cell of another base station BS2 (S1), the mobile station MS transmits a cell transition notice as a handover activation signal to the base station BS1 (S2). In response, the base station BS1 recognizes that a handover to the base station BS2 is required, and transmits a channel set up signal to the base station BS2 (S3). Then, the base station BS2 selects a new channel ch2 (S4), and starts the signal transmission through the channel ch2 (S5).

Next, the base station BS2 transmits an activation completion signal for indicating that the channel ch2 has been activated to the base station BS1 (S6). In response, the base station BS1 transmits a channel specification signal for specifying the channel ch2 to the mobile station MS (S7). Then, the mobile station MS switches its communication channel from the channel ch1 to the channel ch2 (S8). Subsequently, the mobile station MS starts the signal transmission through the channel ch2 to the base station BS2 such that a reception synchronization for this new communication channel ch2 is established at the base station BS2 (S9) and the mobile station MS and the base station BS2 are set in communication with each other (S10).

After that, the base station BS2 transmits a channel release command signal to the base station BS1 (S11). In response, the base station BS1 stops the signal transmission through the channel ch1 (S12) and releases the on-line channel with respect to an exchange station (S13). Then, the handover procedure is completed as the base station BS1 transmits a channel release completion signal to the base station BS2 (S14).

In this conventional handover procedure, at a time of switching from the channel ch1 to the channel ch2, if this mobile communication system uses the frequency division multiple access (FDMA) scheme, a frequency must be changed by switching a synthesizer, and consequently the communication of the mobile station MS will be instantaneously disconnected during a switching time.

Thus, in the conventional mobile communication system in which the mobile station is capable of transmitting and receiving signals through only one channel at a time, there has been a problem that it is associated with a temporal lowering of the service quality due to the occurrence of the interruption of a speech flow or data dropping at a time of switching the base stations in the handover procedure.

SUMMARY OF THE INVENTION

It is therefore an object of the present invention to provide a method and a system for a mobile communication capable of eliminating an instantaneous disconnection of the communication at a time of the handover, so as to realize the highly reliable handover scheme and the improved service quality in the mobile communication system.

According to one aspect of the present invention there is provided a method of handover for a mobile communication in a mobile communication system formed by at least one mobile station, a plurality of base stations, and a composition device connected with the base stations, the method comprising the steps of: transmitting upward communication signals containing identical communication data simultaneously from the mobile station to more than one base stations, at a time of a handover to change a base station used for a communication with the mobile station among said plurality of base stations; and composing upward reception signals at the composition device from the upward communication signals received by said more than one base stations.

According to another aspect of the present invention there is provided a method of handover for a mobile communication in a mobile communication system formed by at least one mobile station, and a plurality of base stations, the method comprising the steps of: transmitting downward communication signals containing identical communication data simultaneously from more than one base stations to the mobile station, at a time of a handover to change a base station used for a communication with the mobile station among said plurality of base stations; and composing downward reception signals at the mobile station from the downward communication signals received from said more than one base stations.

According to another aspect of the present invention there is provided a mobile station device for a mobile communication system formed by at least one mobile station, and a plurality of base stations, the mobile station device comprising: means for transmitting upward communication signals containing identical communication data simultaneously to more than one base stations, at a time of a handover to change a base station used for a communication with the mobile station among said plurality of base stations; means for receiving downward communication signals from the base stations; and means for composing downward reception signals from the downward communication signals received from said more than one base stations at a time of the handover.

According to another aspect of the present invention there is provided a base station side sub-system device for a mobile communication system formed by at least one mobile station, a plurality of base stations, and a composition device connected with the base stations, the base station side sub-system device comprising: means for transmitting downward communication signals containing identical communication data simultaneously from more than one base stations to the mobile station, at a time of a handover to change a base station used for a communication with the mobile station among said plurality of base stations; means for receiving upward communication signals from the mobile station at the base stations; and means for composing upward reception signals at the composition device from the upward communication signals received at said more than one base stations at a time of the handover.

According to another aspect of the present invention there is provided a method of mobile communication in a mobile communication system formed by at least one mobile station, a plurality of base stations, and an upper device connected with the base stations, the method comprising the steps of: (a) at the mobile station, generating packets from communication data to be transmitted, attaching identification information for identifying each packet to the generated packets, and transmitting the packets with the identification information to the base stations; (b) at each base station, receiving the packets from the mobile station, measuring a reliability information indicating a reliability of each packet received at each base station, attaching the reliability information to each packet received at each base station, and transmitting the packets with the reliability information to the upper device; and (c) at the upper device, processing the packets received from the mobile station through the base stations, according to the identification information and the reliability information attached to each packet.

According to another aspect of the present invention there is provided a method of mobile communication in a mobile communication system formed by at least one mobile station, a plurality of base stations, and an upper device connected with the base stations, the method comprising the steps of: (a) at the upper device, generating packets from communication data to be transmitted, attaching identification information for identifying each packet to the generated packets, and transmitting the packets with the identification information to the mobile station through the base stations; and (b) at the mobile station, receiving the packets from the upper device through the base stations, measuring a reliability information indicating a reliability of each packet received from each base station, and composing reception packets from the packets received from the upper device through the base stations, according to the identification information attached to each packet and the reliability information measured for each packet.

According to another aspect of the present invention there is provided a mobile station device for a mobile communication system formed by at least one mobile station, a plurality of base stations, and an upper device connected with the base stations, the mobile station device comprising: means for generating packets from communication data to be transmitted; means for attaching identification information for identifying each packet to each of the packets generated by the generating means; and means for transmitting the packets with the identification information attached by the attaching means to the upper device through the base stations.

According to another aspect of the present invention there is provided a base station side sub-system device for a mobile communication system formed by at least one mobile station, a plurality of base stations, and an upper device connected with the base stations, the base station side sub-system device comprising: means for generating packets from communication data to be transmitted; means for attaching identification information for identifying each packet to each of the packets generated by the generating means; and means for transmitting the packets with the identification information attached by the attaching means from the upper device to the mobile station through the base stations.

Other features and advantages of the present invention will become apparent from the following description taken in conjunction with the accompanying drawings.

DETAILED DESCRIPTION OF THE PREFERRED EMBODIMENTS

Now, the first embodiment of a mobile communication system according to the present invention will be described in detail.

Figure 1:
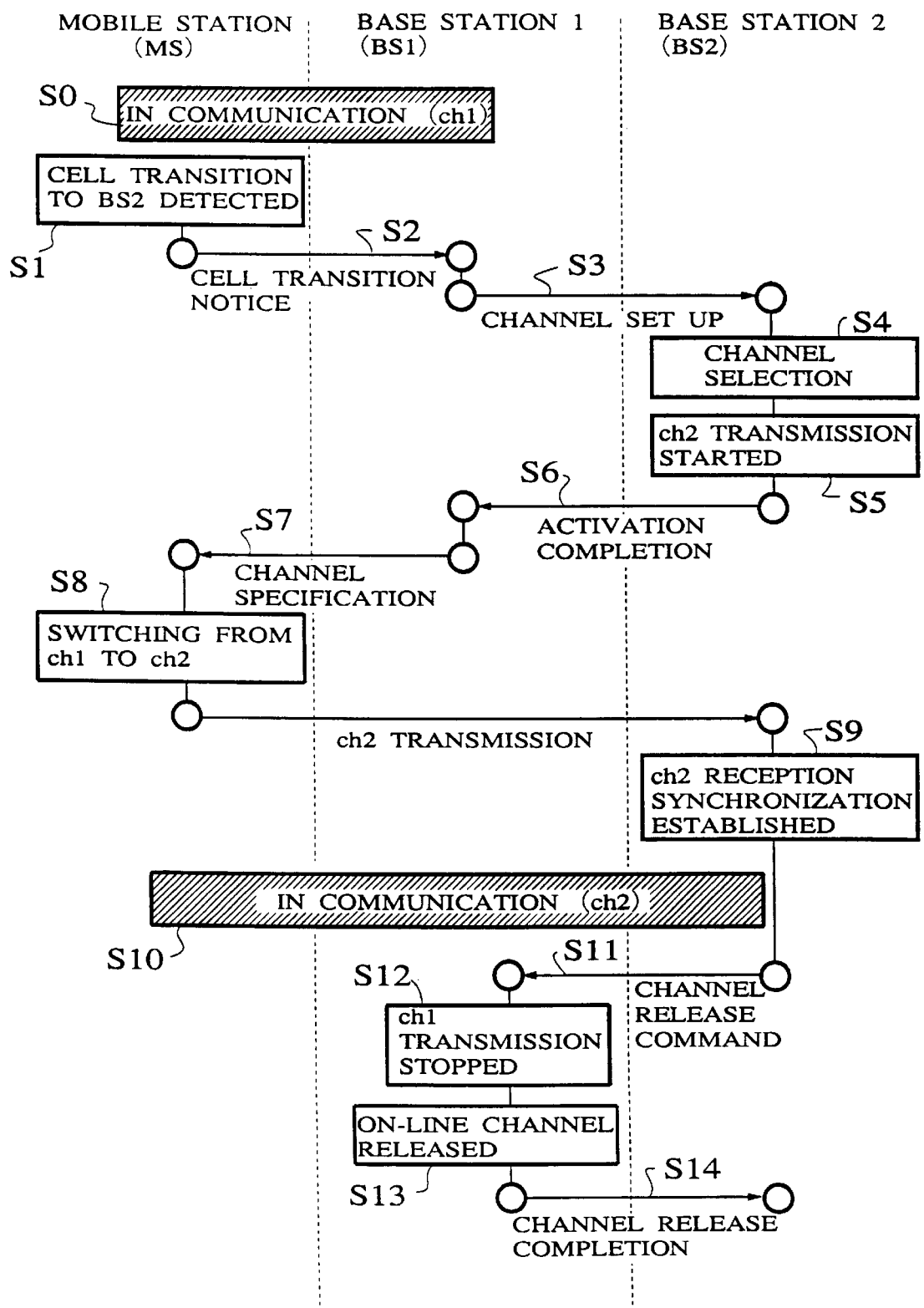
FIG. 1 is a sequence chart for a conventional handover procedure used by a conventional mobile communication system.
Figure 2:
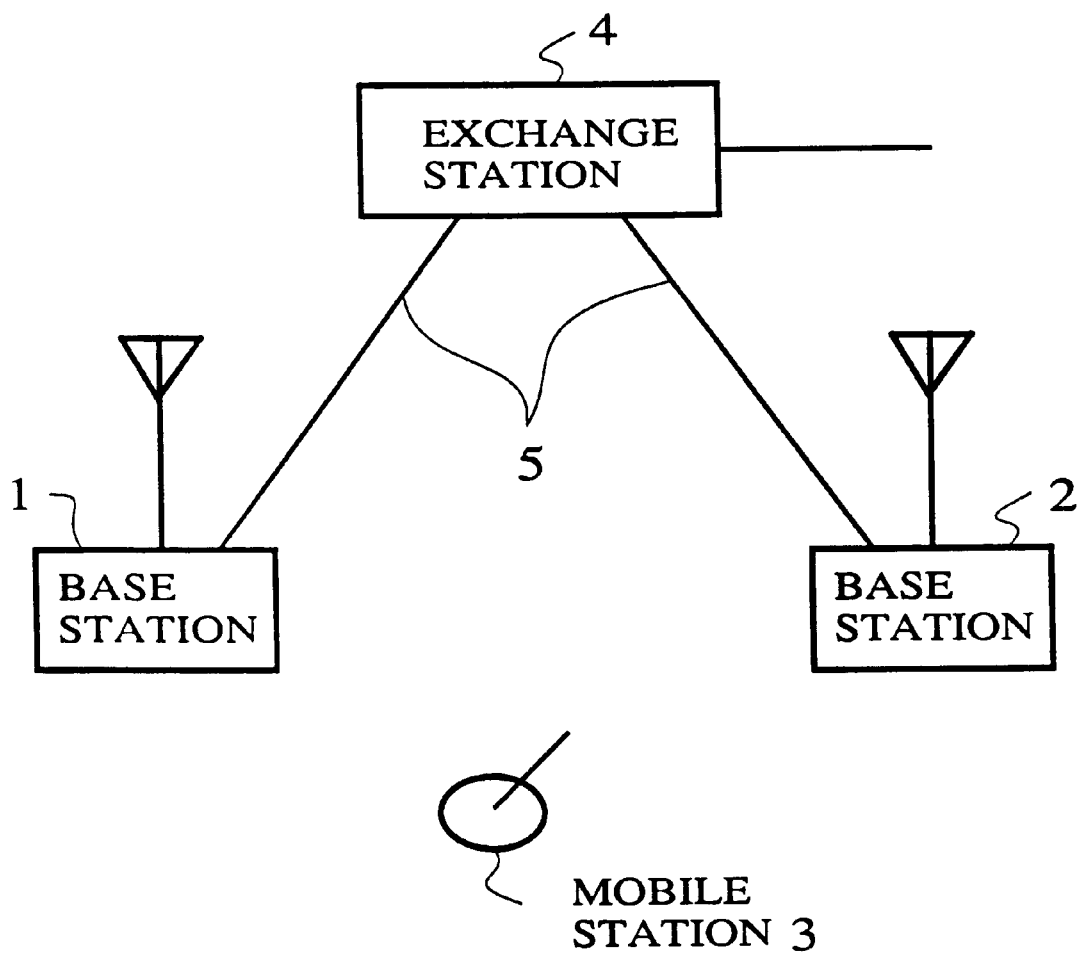
FIG. 2 is a schematic block diagram of an overall configuration for a first embodiment of a mobile communication system according to the present invention.

In this first embodiment, the mobile communication system has a schematic overall configuration as shown in FIG. 2, which comprises a plurality (two in this embodiment) of base stations 1 and 2, a mobile station 3, and an exchange station 4 for exchanging communication signals of the mobile station 3 to be transmitted and received through the base stations 1 and 2, and wire or radio transmission lines 5 for connecting the base stations 1 and 2 with the exchange station 4.

In short, in this configuration, the mobile station 3 is initially in communication with the base station 1 while moving toward the base station 2, and as the mobile station 3 enters into a cell of the base station 2, the mobile station 3 establishes the communication channel with the base station 2 while maintaining the communication state with the base station 1 such that the mobile station 3 is set in a state of being simultaneously in communication with both of the base stations 1 and 2.

In this state, the mobile station 3 receives the signals from both of the base stations 1 and 2, and composes the actual reception signal by utilizing the reliability information for these received signals. On the other hand, the signals transmitted from the mobile station 3 are received by each of the base stations 1 and 2, and the reliability information for these received signals are measured at each of the base stations 1 and 2. The signal received at each of the base stations 1 and 2 is transmitted to the exchange station 4 along with its reliability information through the transmission line 5, and the exchange station 4 composes the actual reception signal by utilizing the reliability information for the received signals.

It is to be noted that the reliability information used in this first embodiment is a radio transmission reliability information to be specific, even though it is referred to simply as the reliability information.

Figure 3:
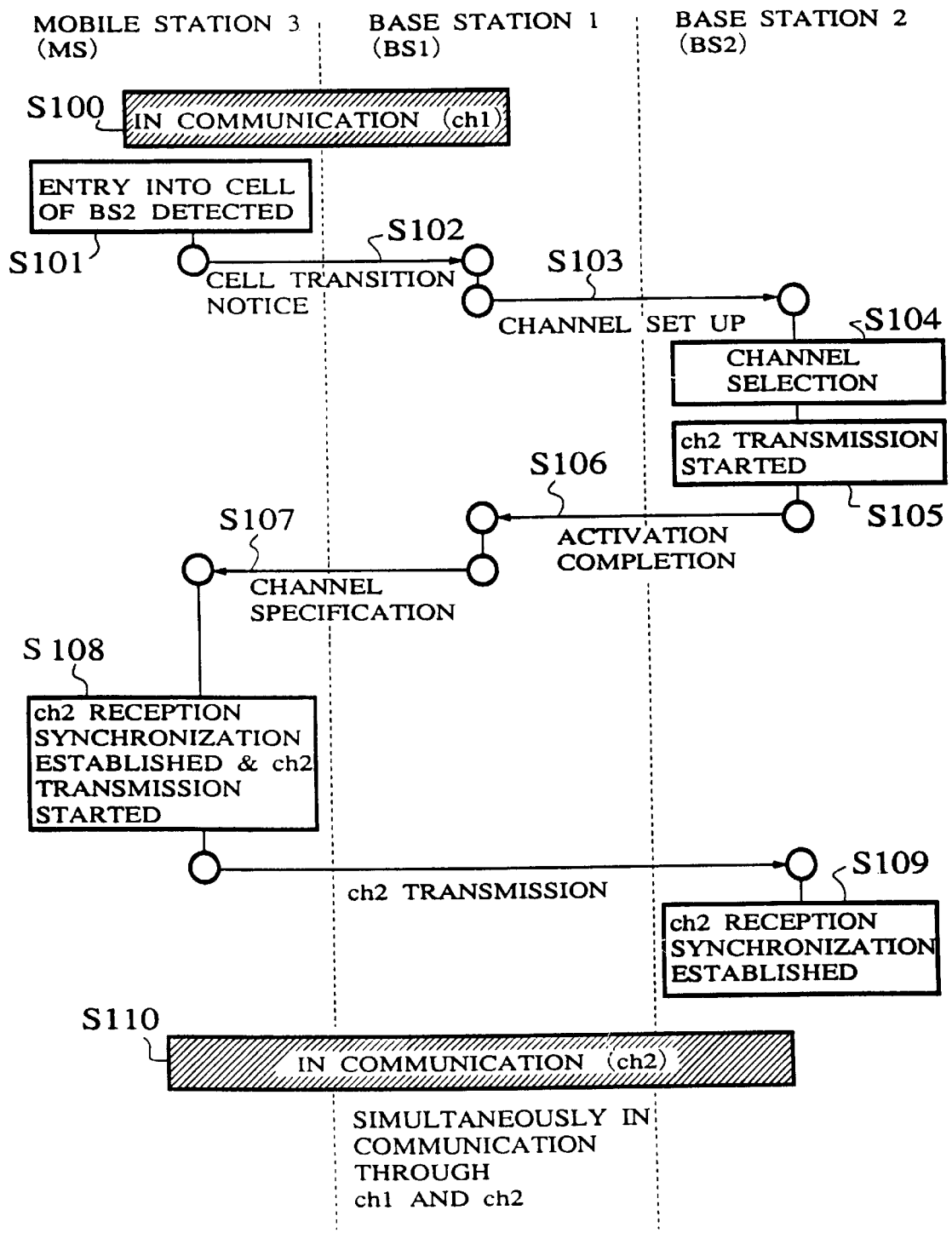
FIG. 3 is a sequence chart for a handover procedure used by the mobile communication system of FIG. 2.

Here, the procedure for setting the mobile station 3 in a state of being simultaneously in communication with both of the base stations 1 and 2 from an original state of being in communication with the base station 1 alone can be carried out according to the sequence chart of FIG. 3 as follows.

Namely, a mobile station MS is initially in communication with a base station BS1 through a channel ch1 (S100). When the mobile station MS detects the entry into a cell of the base station BS2 (S101), the mobile station MS transmits a cell transition notice as a handover activation signal to the base station BS1 (S102). In response,.the base station BS1 recognizes that a handover to the base station BS2 is required, and transmits a channel set up signal to the base station BS2 (S103). Then, the base station BS2 selects a new channel ch2 (S104), and starts the signal transmission through the channel ch2 (S105).

Next, the base station BS2 transmits an activation completion signal for indicating that the channel ch2 has been activated to the base station BS1 (S106). In response, the base station BS1 transmits a channel specification signal for specifying the channel ch2 to the mobile station MS (S107). Then, the mobile station MS establishes the reception synchronization for the channel ch2 and starts the signal transmission through the channel ch2 (S108) in addition to the signal transmission through the channel ch1, such that the reception synchronization for this new communication channel ch2 is established at the base station BS2 (S109) and the mobile station MS and the base station BS2 are set in communication with each other (S110) while the communication state of the mobile station MS and the base station BS1 is maintained, to realize the state of being simultaneously in communication with both of the base stations BS1 and BS2.

Figure 4:
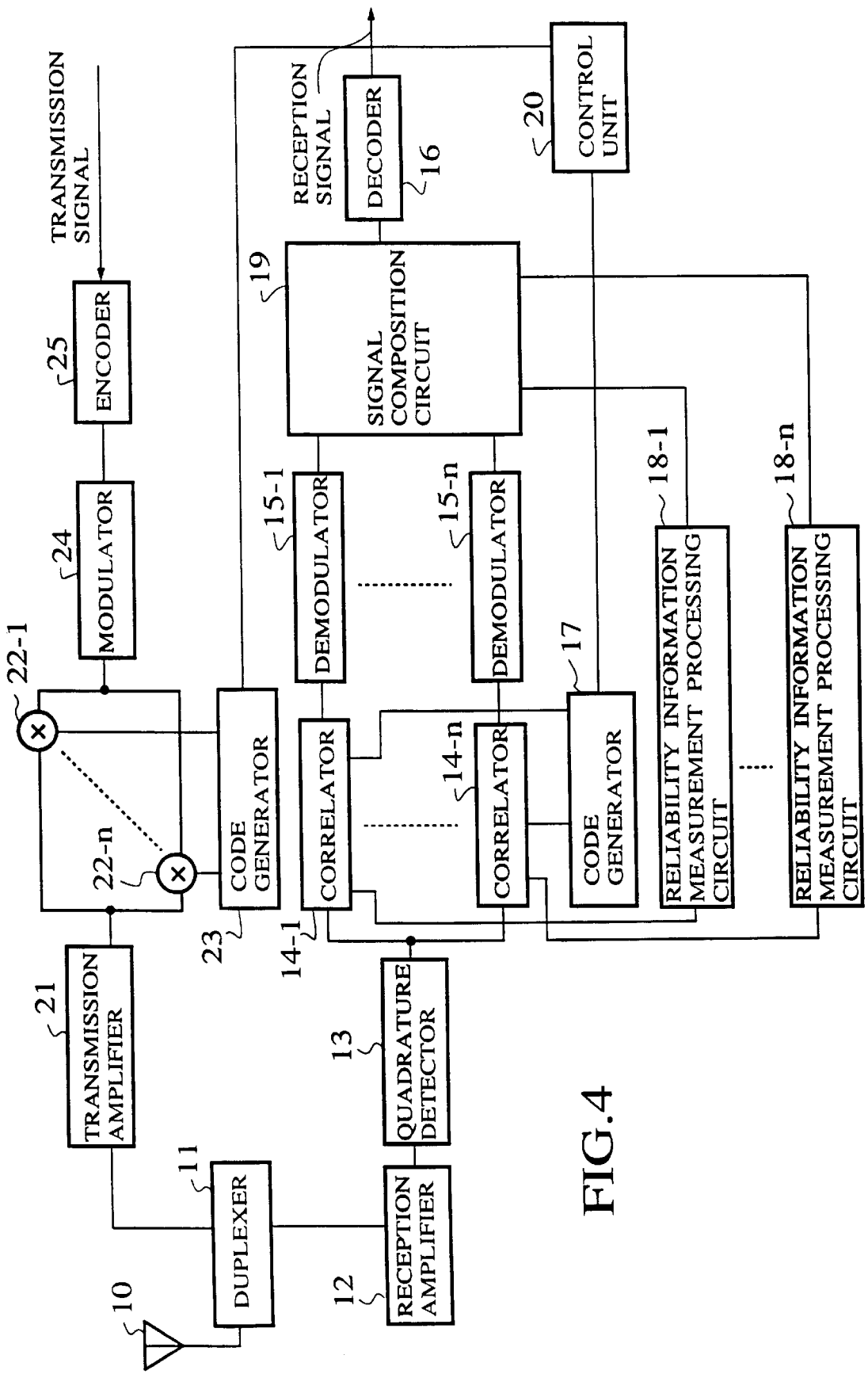
FIG. 4 is a block diagram of a detailed configuration of a mobile station in the mobile communication system of FIG. 2.

The mobile station 3 in the mobile communication system of FIG. 2 has a detailed configuration as shown in FIG. 4. Here, for the sake of definiteness, it is assumed that this mobile communication system uses the code division multiple access (CDMA) scheme.

In FIG. 4, the mobile station 3 comprises an antenna 10, a duplexer 11 connected with the antenna 10, a reception amplifier 12 connected with the duplexer 11, a quadrature detector 13 connected with the reception amplifier 12, a plurality of correlators 14-1 to 14-n connected with the quadrature detector 13, a plurality of demodulators 15-1 to 15-n connected with the respective correlators 14-1 to 14-n, a signal composition circuit 19 connected with the demodulators 15-1 to 15-n, a decoder 16 connected with the signal composition circuit 19 and outputting the reception signal, a code generator 17 connected with the correlators 14-1 to 14-n, a plurality of reliability information measurement processing circuits 18-1 to 18-n connected with the respective correlators 14-1 to 14-n as well as the signal composition circuit 19, a transmission amplifier 21 connected with the duplexer 11, a plurality of multipliers 22-1 to 22-n connected with the transmission amplifier 21, a code generator 23 connected with the multipliers 22-1 to 22-n, a modulator 24 connected with the multipliers 22-1 to 22-n, an encoder 25 connected with the modulator 24 and entering the transmission signal, and a control unit 20 connected with the code generators 17 and 23.

This mobile station 3 in configuration of FIG. 4 carries out the signal transmission operation with respect to the base stations as follows.

Namely, the transmission signal to be transmitted by the mobile station 3 is first error correction encoded by the encoder 25, and then applied with the primary modulation such as QPSK (Quadrature Phase Shift Keying) or BPSK (Bi Phase Shift Keying) by the modulator 24. Then, the primary modulated transmission signal is equally distributed to the multipliers 22-1 to 22-n, which multiply the transmission signal by a plurality of mutually different spread codes specified by the code generator 23 under the control of the control unit 20 so as to obtain a plurality of differently spread transmission signals. These spread transmission signals are then amplified by the transmission amplifier 21, sent to the antenna 10 through the duplexer 11, and transmitted from the antenna 10 to the base stations 1 and 2.

On the other hand, the mobile station 3 in configuration of FIG. 4 carries out the signal reception operation with respect to the base stations as follows. Here, for the sake of definiteness, it is assumed that the signals transmitted from the base stations 1 and 2 are spread by the mutually different spread codes c1 and c2, respectively.

Namely, the signal received by the antenna 10 is sent to the reception amplifier 12 through the duplexer 11, amplified by the reception amplifier 12, and detected by the quadrature detector 13. The detected signal is then entered into the correlators 14-1 to 14-n, to which mutually different spread codes specified by the code generator 23 under the control of the control unit 20 are also entered. Here, in a case of dealing with two base stations 1 and 2 as in FIG. 2, two spread codes c1 and c2 are used in correspondence. At each of the correlators 14-1 to 14-n, the detected signal from the quadrature detector 13 is despread by the specified spread code. In addition, the peak power of the correlation obtained by each of the correlators 14-1 to 14-n is set as the reception level, and this reception level is measured for each transmission symbol in each received transmission symbol sequence separately by each of the reliability information measurement processing circuits 18-1 to 18-n as the reliability information for each transmission symbol.

Then, the outputs of the correlators 14-1 to 14-n are demodulated by the demodulators 15-1 to 15-n, respectively, and the outputs of the demodulators 15-1 to 15-n are entered into the signal composition circuit 19. This signal composition circuit 19 has a buffering function for synchronizing the received transmission symbols entered from the demodulators 15-1 to 15-n. In addition, this signal composition circuit 19 also receives the reliability information for each transmission symbol from the reliability information measurement processing circuits 18-1 to 18-n in synchronization with the received transmission symbols, and selectively outputs the received transmission symbol with the highest reliability among the received transmission symbols. The output of the signal composition circuit 19 is then decoded by the decoder 16 to obtain the actual reception signal.

In this configuration of FIG. 4, the communication signals are transmitted in units of bits up to the modulator 24 on the transmission side and after the demodulators 15-1 to 15-n on the reception side, while the communication signals are transmitted in units of symbols after the modulator 24 on the transmission side and up to the demodulators 15-1 to 15-n on the reception side.

It is to be noted that the transmission part of this mobile station 3 in configuration of FIG. 4 described above has n sets of transmission sequences so as to be able to transmit signals simultaneously to n sets of base stations by establishing n sets of radio channels, in consideration of a general case for simultaneously communicating with n sets of base stations, but in a case of dealing with two base stations 1 and 2 as in FIG. 2, it suffices to have two sets of transmission sequences. Moreover, in a case of assigning two different spread codes to these two base stations, two different spread codes are to be assigned to these two transmission sequences, but in a case of using the same spread code in these two base stations, it suffices to have only one transmission sequence using only one spread code.

Similarly, the reception part of this mobile station 3 in configuration of FIG. 4 described above has n sets of reception sequences so as to be able to receive signals simultaneously from n sets of base stations by establishing n sets of radio channels, in consideration of a general case for simultaneously communicating with n sets of base stations, but in a case of dealing with two base stations 1 and 2 as in FIG. 2, it suffices to have two sets of reception sequences.

As for the measurement of the reliability information, an exemplary case of using the reception level for each transmission symbol has been described above, and the detail of the method for measuring this reception level can be found in Japanese Patent Application No. 5-49318 (1993) which is directed to the method and the mobile station device for carrying out the cell judgment in the mobile communication. Also, instead of using the reception level as described above, the signal to interference ratio (SIR) can be used as the reliability information, if desired. The detail of the method for measuring this SIR can also be found in the aforementioned Japanese Patent Application No. 5-49318 (1993).

It is also to be noted that, instead of using the reliability information for each received transmission symbol as described above, it is also possible to form a block by grouping a plurality of transmission symbols together and measure the reliability information for each received block, such that the signal composition is carried out in units of blocks.

It is also to be noted that the configuration of FIG. 4 may be modified to provide a plurality of decoders between the demodulators 15-1 to 15-n and the signal composition circuit 19 instead of a single decoder 16 after the signal composition circuit 19. In such a case, the signal composition circuit 19 composes the actual reception signal in units of bits by selectively outputting the received transmission bit with the highest reliability, according to the reliability information for each transmission bit derived from the reliability information for each transmission symbol. In general, it can be said that the signal composition circuit 19 selectively outputs the received data sequence with the highest reliability.

As for the method of signal composition, instead of adopting a scheme for selecting the highest reliability one as described above, it is also possible to use the reliability information as the soft decision information for weighting the respective signals, if desired.

Figure 5:
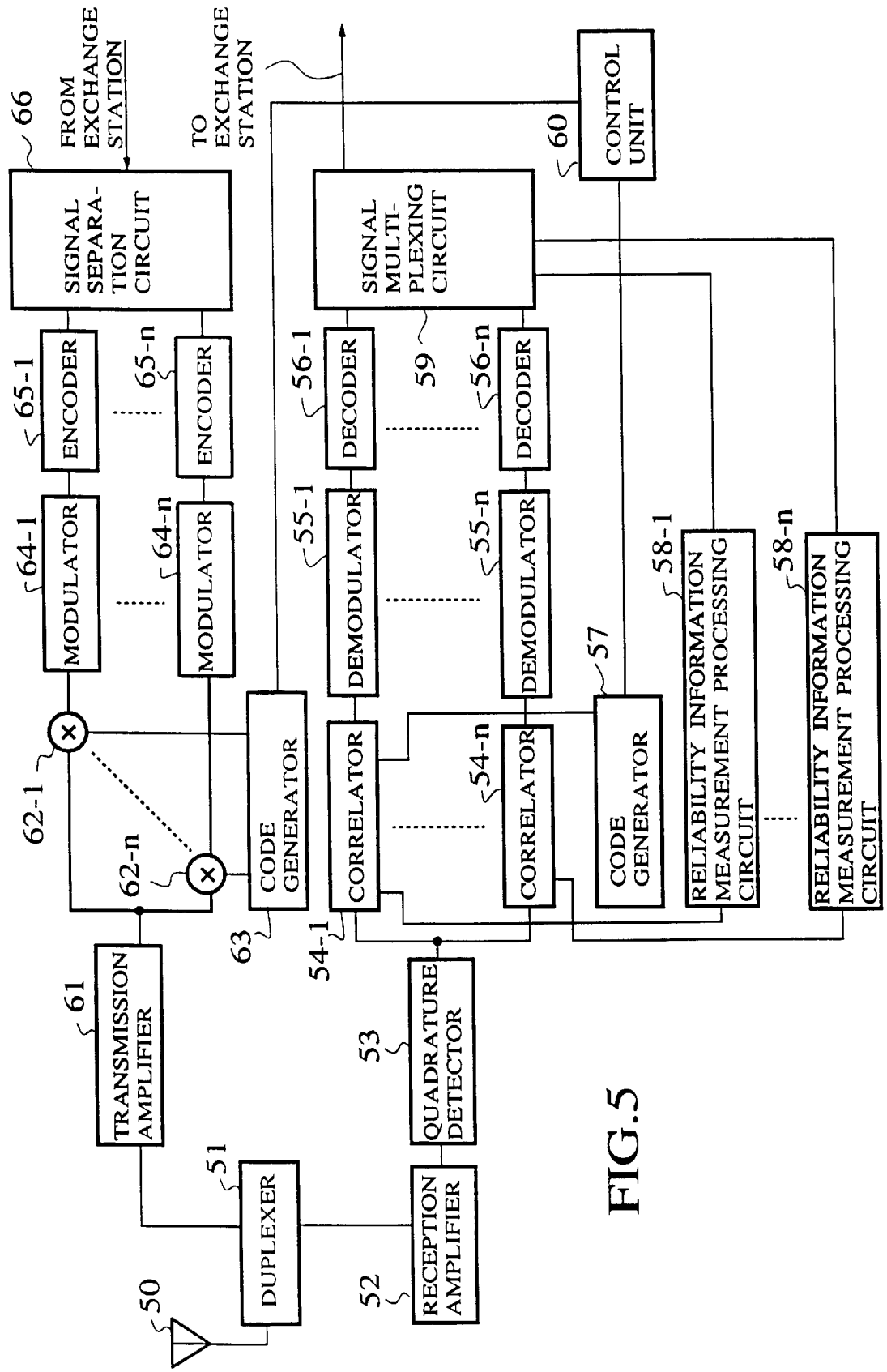
FIG. 5 is a block diagram of a detailed configuration of each base station in the mobile communication system of FIG. 2.

Each of the base stations 1 and 2 in the mobile communication system of FIG. 2 has a detailed configuration as shown in FIG. 5. Here, again, for the sake of definiteness, it is assumed that this mobile communication system uses the code division multiple access (CDMA) scheme.

In FIG. 5, the base station 1 or 2 comprises an antenna 50, a duplexer 51 connected with the antenna 50, a reception amplifier 52 connected with the duplexer 51, a quadrature detector 53 connected with the reception amplifier 52, a plurality of correlators 54-1 to 54-n connected with the quadrature detector 53, a plurality of demodulators 55-1 to 55-n connected with the respective correlators 54-1 to 54-n, a plurality of decoders 56-1 to 56-n connected with the respective demodulators 55-1 to 55-n, a signal multiplexing circuit 59 connected with the decoders 56-1 to 56-n and outputting the reception signal to the exchange station 4, a code generator 57 connected with the correlators 54-1 to 54-n, a plurality of reliability information measurement processing circuits 58-1 to 58-n connected with the respective correlators 54-1 to 54-n as well as the signal composition circuit 59, a transmission amplifier 61 connected with the duplexer 51, a plurality of multipliers 62-1 to 62-n connected with the transmission amplifier 61, a code generator 63 connected with the multipliers 62-1 to 62-n, a plurality of modulators 64-1 to 64-n connected with the respective multipliers 62-1 to 62-n, a plurality of encoders 65-1 to 65-n connected with the respective modulators 64-1 to 64-n, a signal separation circuit 66 connected with the modulators 65-1 to 65-n and entering the transmission signal from the exchange station 4, and a control unit 60 connected with the code generators 57 and 63.

This base station in configuration of FIG. 5 carries out the signal transmission operation with respect to the mobile station as follows.

The signals to be transmitted from the base station to a number of mobile stations are given in multiplexed form from the exchange station 4, so that these multiplexed signals are separated for different channels by the signal separation circuit 66, and entered into the encoders 65-1 to 65-n corresponding to these different channels.

For a signal transmission with respect to one specific mobile station, the transmission signal separated into each channel by the signal separation circuit 66 is error correction encoded by the encoder 65-1, and then applied with the primary modulation such as QPSK (Quadrature Phase Shift Keying) or BPSK (Bi Phase Shift Keying) by the modulator 64-1. Then, the primary modulated transmission signal is entered into the multiplier 62-1, which multiplies the transmission signal by a corresponding spread code specified by the code generator 63 under the control of the control unit 60 so as to obtain the spread transmission signal. The similar operation using the encoders 65-2 to 65-n, the modulators 64-2 to 64-n, and the multipliers 62-2 to 62-n are also carried out for the signals of the other channels as well. Here, the spread code generated by the code generator 63 is controlled by the control unit 60 to be that which is set for use in the communication between this base station and each mobile station.

Then, all the spread transmission signals are added together and then amplified by the transmission amplifier 61, sent to the antenna 50 through the duplexer 51, and transmitted from the antenna 50 to the mobile stations.

On the other hand, the base station in configuration of FIG. 5 carries out the signal reception operation with respect to the mobile station as follows.

Namely, the signal transmitted from the mobile station and received by the antenna 50 is sent to the reception amplifier 52 through the duplexer 51, amplified by the reception amplifier 52, and detected by the quadrature detector 53. The detected signal is then entered into the correlators 54-1 to 54-n, to which mutually different spread codes specified by the code generator 53 under the control of the control unit 60 in correspondence to the different mobile stations are also entered.

At the correlator 54-1, the detected signal from the quadrature detector 53 is despread by the specified spread code. In addition, the peak power of the correlation obtained by the correlator 54-1 is set as the reception level, and this reception level is measured for each transmission symbol in the received transmission symbol sequence separately by the reliability information measurement processing circuit 58-1 as the reliability information for each transmission symbol. Then, the output of the correlator 54-1 is demodulated by the demodulator 55-1, and decoded by the decoder 56-1. The similar operation using the correlators 54-2 to 54-n, the demodulators 55-2 to 55-n, the decoders 56-2 to 56-n, and the reliability information measurement processing circuits 58-2 to 58-n are also carried out for the signals of the other channels as well.

The decoded signals from the decoders 56-1 to 56-n are then multiplexed by the signal multiplexing unit 59 in units of bits in correspondence with the corresponding reliability information supplied from the reliability information measurement processing circuits 58-1 to 58-n, and outputted to the exchange station 4.

In this configuration of FIG. 5, the communication signals are transmitted in units of bits up to the modulators 64-1 to 64-n on the transmission side and after the demodulators 55-1 to 55-n on the reception side, while the communication signals are transmitted in units of symbols after the modulators 64-1 to 64-n on the transmission side and up to the demodulators 55-1 to 55-n on the reception side.

In the mobile communication system of FIG. 2, the base stations 1 and 2 has the same detailed configuration as shown in FIG. 5, and carries out the basically similar operation. Here, however, depending on which spread codes are used for the communications of the base stations 1 and 2 with respect to the mobile station 3, for a signal reception at both of the base stations 1 and 2, the same spread code is used in a case the same spread code is used for a signal transmission from the mobile station 3 with respect to both of the base stations 1 and 2, or the different spread codes are used in a case the different spread codes are used for a signal transmission from the mobile station 3 with respect to the base stations 1 and 2. Similarly, for a signal transmission from the base stations 1 and 2 with respect to the mobile station 3, the same spread code is used in a case the base stations 1 and 2 are synchronized and using the same spread code, or the different spread codes are used in a case the different spread codes are used regardless of whether the base stations 1 and 2 are synchronized or not.

As for the measurement of the reliability information, an exemplary case of using the reception level for each transmission symbol has been described above Just as in a case of the mobile station of FIG. 4, and the detail of the method for measuring this reception level can be found in the aforementioned Japanese Patent Application No. 5-49318 (1993). Also, instead of using the reception level as described above, the signal to interference ratio (SIR) can be used as the reliability information, if desired. The detail of the method for measuring this SIR can also be found in the aforementioned Japanese Patent Application No. 5-49318 (1993).

It is also to be noted that, instead of using the reliability information for each received transmission symbol as described above, it is also possible to form a block by grouping a plurality of transmission symbols or bits together and measure the reliability information for each received block, such that the signal composition at the exchange station 4 is carried out in units of blocks.

It is also to be noted that, for the mobile station of FIG. 4 as well as for the base station of FIG. 5, the demodulator can be any circuit that can demodulate the CDMA signal. For instance, it is possible to use the RAKE demodulator for receiving a plurality of delayed waves and carrying out the diversity composition, or the demodulator as disclosed in Japanese Patent Application No. 4-83947 (1992) which weights the delayed waves, and carries out the diversity composition, so as to realize the demodulation more efficiently. Note that this Japanese Patent Application No. 4-83947 (1992) is directed to a receiver used in the spectrum spreading scheme, and more particularly, to a demodulator for carrying out the diversity composition for a plurality of delayed waves efficiently.

Figure 6:
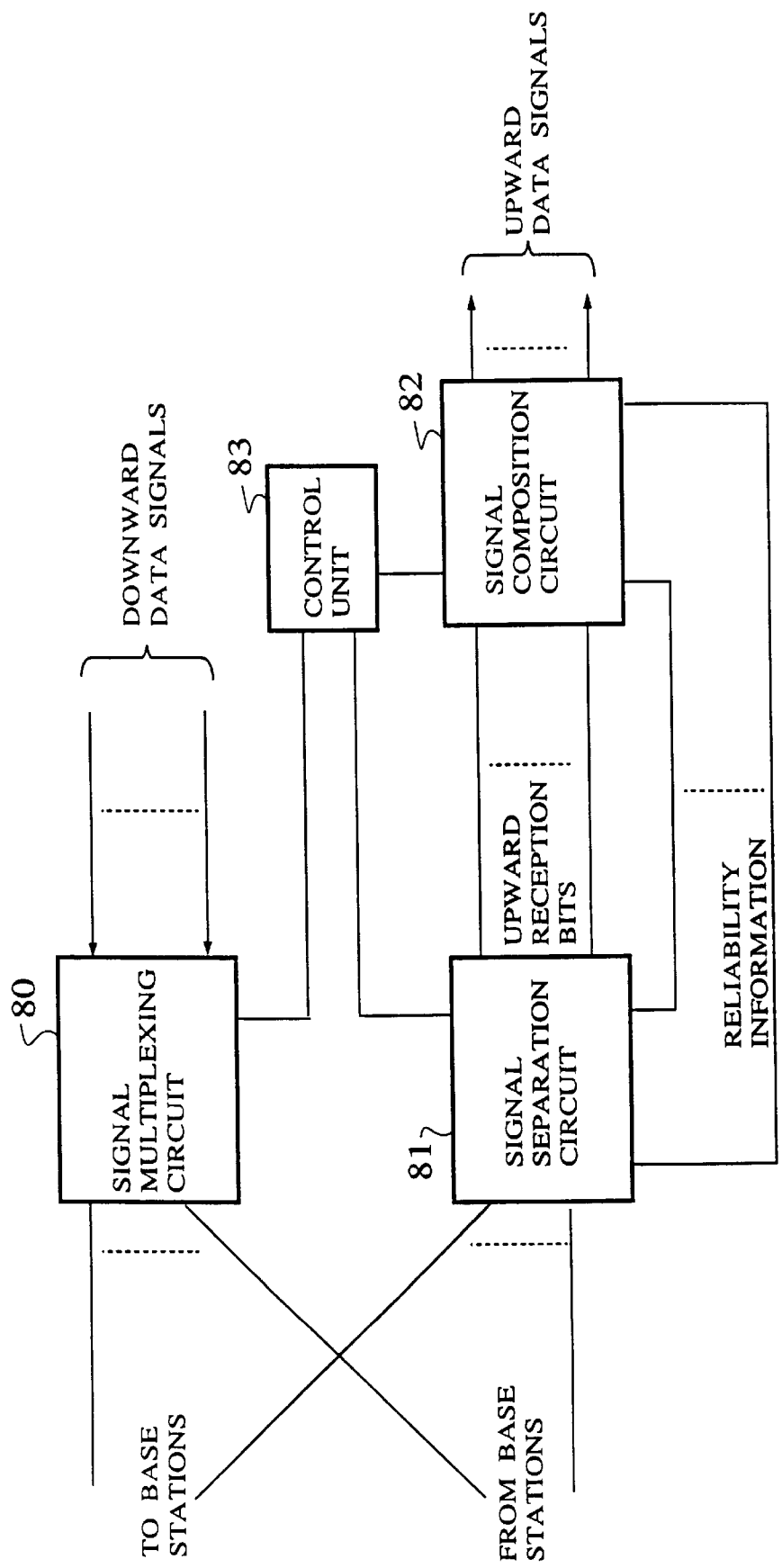
FIG. 6 is a block diagram of a detailed configuration of an exchange station in the mobile communication system of FIG. 2.

The exchange station 4 in the mobile communication system of FIG. 2 has a detailed configuration as shown in FIG. 6.

In FIG. 6, the exchange station 4 includes a signal multiplexing circuit 80 for multiplexing a plurality of downward data signals with respect to a plurality of mobile stations and transmitting the multiplexed signals to the base stations, which has a function for distributing the data signals with respect to one mobile station to a plurality of base stations which are in communication with this one mobile station simultaneously. The exchange station 4 also includes a signal separation circuit 81 for separating the multiplexed signals transmitted from a plurality of base stations into the data signals (upward reception bits) and the corresponding reliability information, and a signal composition circuit 82 having a buffer (not shown) in correspondence to each channel for synchronizing the data signals received from a plurality of base stations and separated by the signal separation circuit 81, and composing the upward data signals from these synchronized signals according to the corresponding reliability information. The exchange station 4 also includes a control unit 83 for controlling the operations of the signal multiplexing circuit 80, the signal separation circuit 81, and the signal composition circuit 82.

This exchange station 4 in configuration of FIG. 6 carries out the signal transmission operation with respect to the base stations as follows.

Namely, the data signals to be transmitted to the mobile station are multiplexed at the signal multiplexing circuit 80 and then transmitted to the base stations in multiplexed form. At this point, when the target mobile station is in the handover operation, the base station IDs of the base stations involved in this handover operation are specified from the control unit 83, so that the data signals with respect to this mobile station are duplicated and transmitted to all the specified base stations in the multiplexed form.

On the other hand, the exchange station 4 in configuration of FIG. 6 carries out the signal processing operation for the signals received from the base stations as follows.

Namely, the signals received from the base stations are separated into the data signals and the reliability information by the signal separation circuit 81, and the then entered into the signal composition circuit 82. At this signal composition circuit 82, the received bits from any mobile station which is not in a state of being simultaneously in communication with a plurality of base stations are outputted as they are. However, for the received bits from a mobile station which is in a state of being simultaneously in communication with a plurality of base stations, the signal composition circuit 82 is controlled by the control unit 83 to check the reliability information of each received bit for comparison and the received bit with the highest reliability is selectively outputted as the upward data signal.

It is also to be noted that, instead of using the reliability information for each received bit as described above, it is also possible to form a block by grouping a plurality of received bits together and measure the reliability information for each received block, such that the signal composition is carried out in units of blocks.

As for the method of signal composition, instead of adopting a scheme for selecting the highest reliability one as described above, it is also possible to use the reliability information as the soft decision information for weighting the respective signals, if desired.

In this first embodiment, an exemplary case in which the mobile station at a time of the handover is in a state of being simultaneously in communication with two base stations has been described, but a more general case in which the mobile station in a state of being simultaneously in communication with any number of base stations can be realized in the similar manner.

Also, in this first embodiment, an exemplary case of using the CDMA scheme has been described, but the present invention is basically applicable to a case of using the FDMA (Frequency Division Multiple Access) scheme or the TDMA (Time Division Multiple Access) scheme, by merely changing the channel unit to a frequency or a frequency+slot, and replacing the correlators and the spreaders (multipliers) with suitable circuit elements.

Also, this first embodiment has been described for an exemplary system using the exchange station 4 in a configuration of FIG. 6, but the signal composition section of this exchange station 4 may not necessarily be a part of the exchange station in general, and can be provided in a form of a signal composition device located in any upper side device of each base station other than the exchange station.

As described, according to this first embodiment, at a time of the handover, it is possible for the mobile station to make the communications simultaneously with all the base stations involved in the handover, so that an occurrence of the instantaneous disconnection of the communication at a time of the handover can be prevented, and therefore the service quality can be improved.

Also, for the mobile station in communication with a plurality of base stations simultaneously, when the correlation among the radio channel qualities of the respective channels is low, it is possible to achieve the site diversity effect, so that the transmission power of the mobile station and the base station can be suppressed as much as the site diversity gain part. Consequently, the power consumption can be made smaller as much, and the period of time during which the communication is possible can be made longer as much. In addition, in a case of using the CDMA scheme, the less transmission power implies the less interference with respect to the other channels, so that a number of mobile stations that can be accommodated in the system can be increased. Moreover, although the more transmission power is generally required for the communication with the mobile station located near the cell boundary, the lowering of the required transmission power due to the site diversity gain implies that it is possible to narrow the dynamic range of the amplifier, such that it is possible to reduce the cost required for the actual implementation of the system easily.

Now, the second embodiment of a mobile communication system according to the present invention will be described in detail.

In general, in a mobile communication system using signal transmissions based on circuit exchanges, signals to be transmitted from the exchange station through the base stations to the mobile station are transmitted from the exchange station by synchronizing all the channels from the exchange station to the base stations. At the base station, the reception timing of the signal transmitted from the exchange station is used as a reference timing for carrying out the signal transmission to the exchange station as well as the signal transmission and reception with respect to the mobile station. Furthermore, at the mobile station, the reception timing of the signal transmitted from the base station is used as a reference timing for carrying out the signal transmission to the base station.

Figure 7:
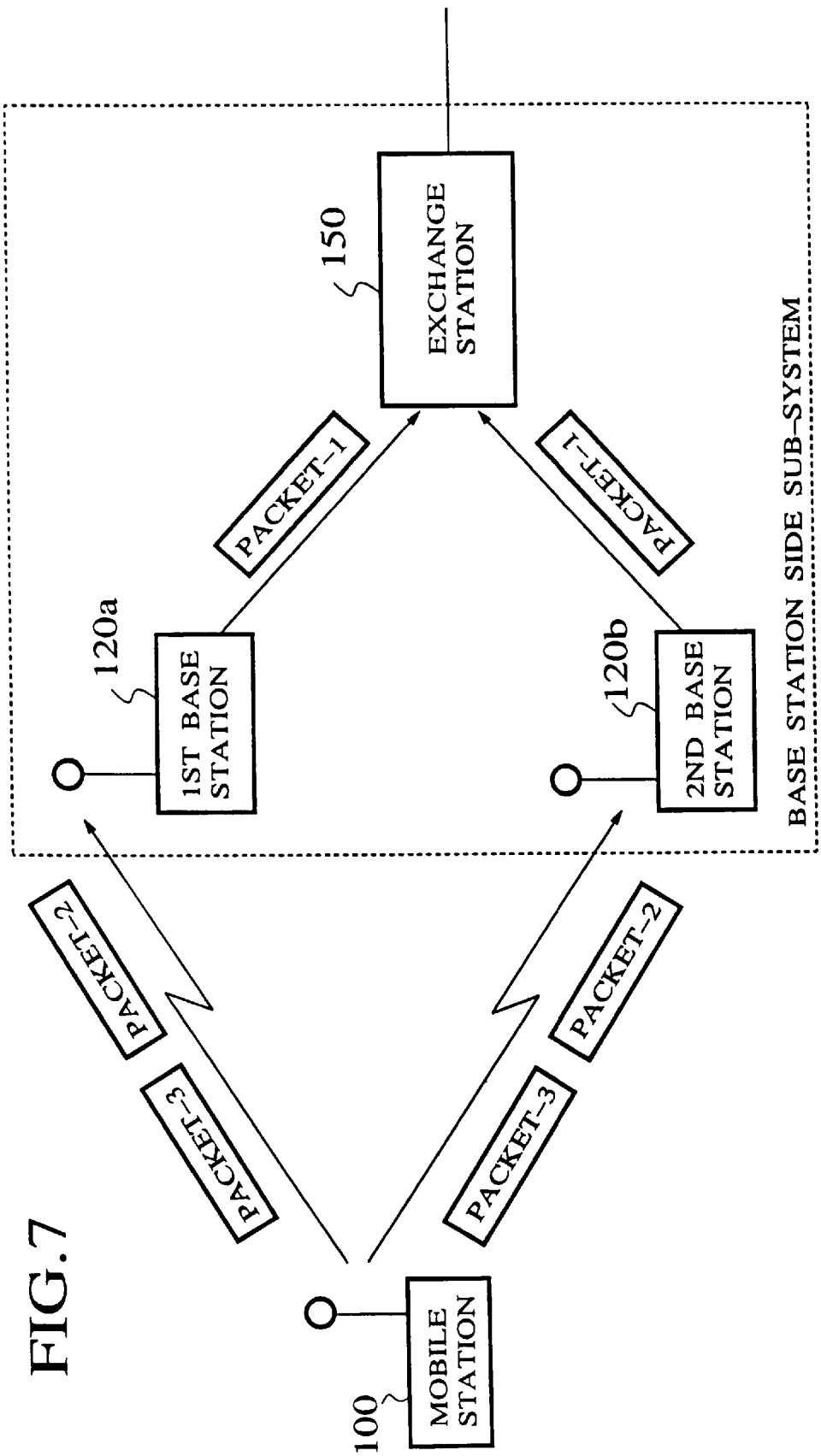
FIG. 7 is a schematic block diagram of an overall configuration for a second embodiment of a mobile communication system according to the present invention.

For example, in a case the mobile station makes the communications using packet signals with a plurality of base stations simultaneously in a manner similar to that of the first embodiment described above, the mobile communication system has a schematic overall configuration as shown in FIG. 7. In this mobile communication system of FIG. 7, a mobile station 100 transmits the identical packet signals to a plurality of base stations 120a and 120b simultaneously. Then, each of the base stations 120a and 120b transmits the received packet signals to an exchange station 150. Here, there is a need for the exchange station 150 to select one packet signal among a plurality of identical packet signals received and transmitted by a plurality of base stations 120a and 120b. In other words, in the mobile communication network based on the circuit exchanges, one packet must be selected out of a plurality of packets received from a plurality of base stations at an identical timing.

To this end, however, the packet itself has no information useful in making this selection conventionally, so that in a conventional mobile communication system, the packet must be selected by a fixed selection scheme such as that which selects the packet transmitted through the latest channel at the highest priority, for example.

Similarly, the packet transmission from the exchange station 150 to the mobile station 100 can also be realized by reversing functions of the exchange station 150 and the mobile station 100 in the above described procedure for the packet transmission from the mobile station 100 to the exchange station 150. In other words, the exchange station 150 transmits the identical packet signals to a plurality of base stations 120a and 120b simultaneously, and then the mobile station 100 selects one of the received packet signals. Here, again, in a conventional mobile communication system, the packet must be selected at the mobile station by a fixed selection scheme.

Now, in general, in such a mobile communication system based on the circuit exchanges, at a time of the handover processing, the time required for the signal transmission between the mobile station and the exchange station can be largely different for different channels using different base stations whenever the distance to the mobile station is different for different base stations, or the signal transmission time to the exchange station is different for different base stations, or the signal processing time is different for different base stations. In other words, a plurality of packet signals containing the identical data transmitted from the mobile station or the exchange station through a plurality of base stations may not be received at the exchange station or the mobile station at the identical timing, so that when the channel for transmitting the packets is changed due to the movement of the mobile station, there is a possibility for an occurrence of the partial dropping or the unnecessary repetition of the transmitted packet signals.

Also, as there is no guarantee that the packets transmitted at the identical timing through a plurality of simultaneously connected channels are representing the same data, there is a possibility for an occurrence of an erroneous operation in which a plurality of packets representing different data which are transmitted at the identical timing are erroneously regarded as the packets representing the same data, and a processing for selecting one packet is erroneously applied to these plurality of packets, such that the packets that should not be discarded are erroneously discarded.

Moreover, when one packet signal is selected out of a plurality of received packet signals by a fixed selection scheme, there is a possibility for selecting a received packet signal containing an error, despite of the presence of another received packet signal without any error.

In view of the above, this second embodiment aims to provide a mobile communication system capable of preventing the partial dropping or the unnecessary repetition of the transmitted packet signals even when the time required for the signal transmission between the mobile station and the exchange station is different for different channels using different base stations, so as to realize a more reliable handover scheme in the packet communication. Also, this second embodiment aims to provide a mobile communication system capable of selecting the best received packet signal from a plurality of received packet signals, so as to realize a high quality packet transmission.

To this end, the mobile communication system of this second embodiment adopts the detailed configurations for the mobile station 100, each of the base station 120a and 120b, and the exchange station 150 as described in the following with reference to FIG. 8 to FIG. 12, within an overall framework as shown in FIG. 7.

Figure 8:
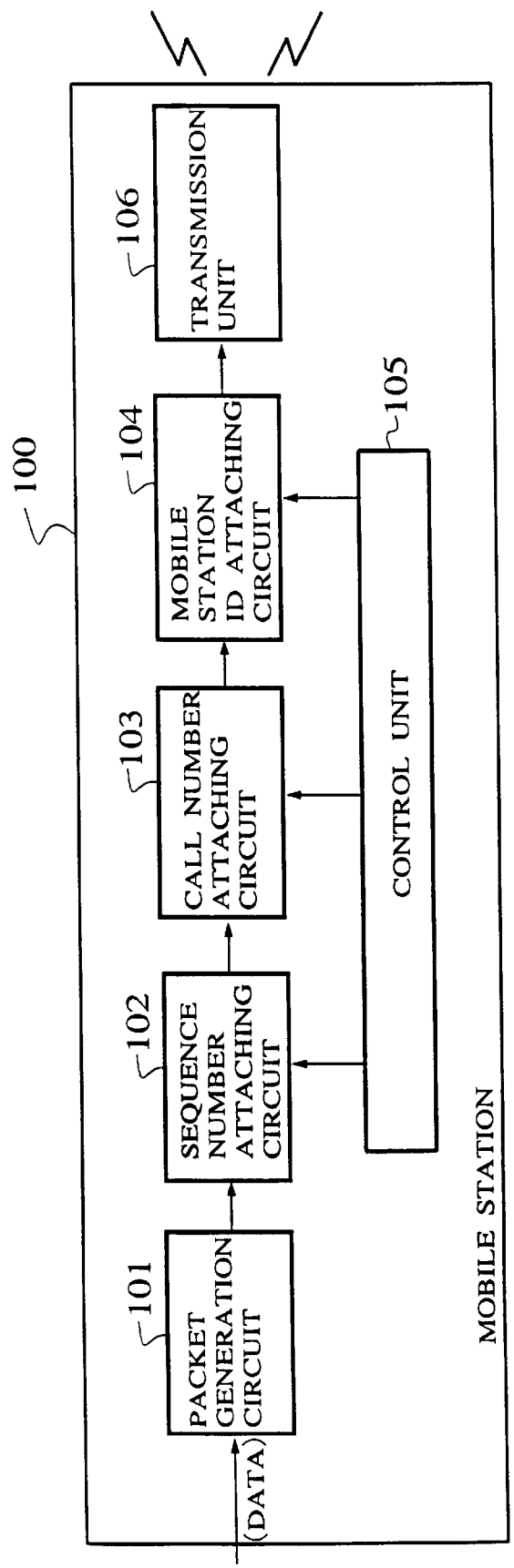
FIG. 8 is a block diagram of a detailed configuration for a signal transmission section of a mobile station in the mobile communication system of FIG. 7.

First, the mobile station 100 has a partial configuration related to the signal transmission from the mobile station to the base station as shown in FIG. 8.

Namely, a signal transmission section of the mobile station 100 comprises a packet generation circuit 101, a sequence number attaching circuit 102, a call number attaching circuit 103, a mobile station ID attaching circuit 104, and a transmission unit 106, which are connected in series in this order, and a control unit 105 connected with the sequence number attaching circuit 102, the call number attaching circuit 103, and the mobile station ID attaching circuit 104, where the data to be transmitted are entered into the packet generation circuit 101 and outputted from the transmission unit 106.

The signal transmission operation by this signal transmission section of the mobile station 100 will now be described for an exemplary case of forming packets from entered data, and transmitting packets in multiplexed form.

First, the packet generation circuit 101 divides the entered data into packets of predetermined length, and outputs the obtained packets to the sequence number attaching circuit 102.

Then, the sequence number attaching circuit 102 attaches a sequence number indicating an order among these entered packets to each of the entered packets. Here, the sequence number is set to be an ordered number which is increased by one for each newly entered packet, and reset to 0 whenever it reaches a predetermined value. Next, to each of the entered packets, the call number attaching circuit 103 attaches a call number which is used as an identifier in making a call identification for each packet at the base station side in a case the mobile station 100 deals with a plurality of calls. Then, to each of the entered packets, the mobile station ID attaching circuit 104 attaches a mobile station ID which is used as an identifier in making a mobile station identification for each packet at the base station side.

Here, the control unit 105 provides control signals for controlling the above described operations to attach the sequence number, the call number, and the mobile station ID, to the sequence number attaching circuit 102, the call number attaching circuit 103, and the mobile station ID attaching circuit 104.

Then, the transmission unit 106 applies the data packet encoding and modulation processing to make the entered packets suitable for the radio transmission, and transmits the resulting packets to one or a plurality of base stations.

Figure 9:
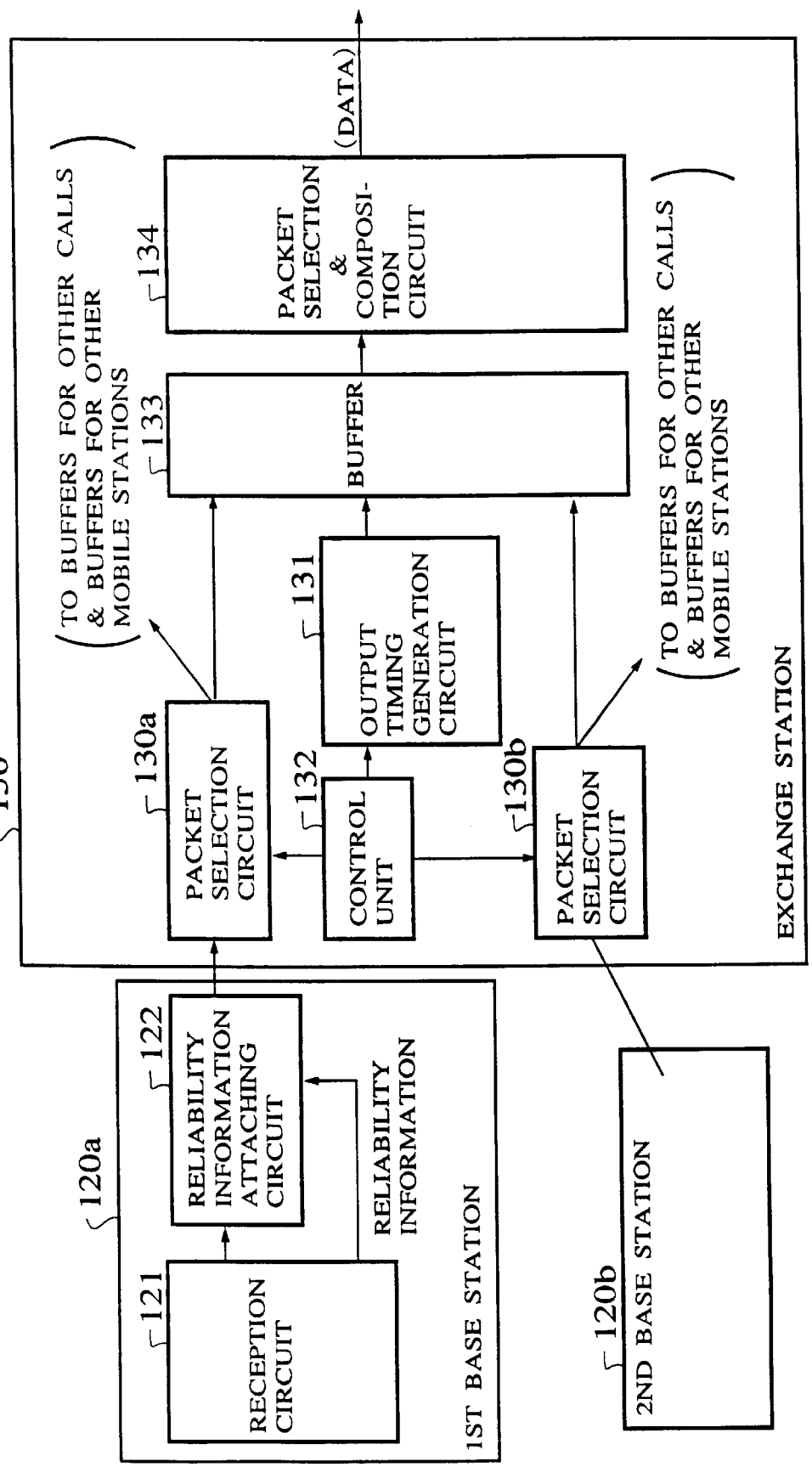
FIG. 9 is a block diagram of a detailed configuration for a signal reception section of a base station side sub-system in the mobile communication system of FIG. 7.

On the other hand, the base station side sub-system including a plurality of base stations 120a and 120b and the exchange station 150 has a partial configuration related to the signal reception from the mobile station as shown in FIG. 9.

Here, the first base station 120a and the second base station 120b have identical configuration, and a signal reception section of each base station 120 comprises a reception circuit 121 and a reliability information attaching circuit 122. The reception circuit 121 is a circuit for receiving the packets transmitted from the mobile station, and equipped with a function for demodulating and decoding the received signal as well as a function for measuring the reliability information for each received packet. The reliability information attaching circuit 122 is a circuit for attaching the reliability information measured and outputted by the reception circuit 121 to each received packet, and outputting it to the exchange station 150.

A signal reception section of the exchange station 150 includes a plurality of packet selection circuits 130a and 130b provided in correspondence to a plurality of base stations 120a and 120b, which are connected to a buffer 133 for each call of each mobile station, as well as other buffers (not shown) for other calls and other mobile stations which are similar to the buffer 133, and a control unit 132 connected with the packet selection circuits 130a and 130b as well as an output timing generation circuit 131 which is also connected with the buffer 133. The output of the buffer 133 is connected with a packet selection and composition circuit 134 for outputting received data packets.

This signal reception section of the exchange station 150 operates as follows. Here, the operation using the packet selection circuit 130a side with respect to the packets entered from the first base station 120a is substantially identical to the operation using the packet selection circuit 130b side with respect to the packets entered from the second base station 120b, so that only the operation using the packet selection circuit 130a side will be described.

First, the packet selection circuit 130a sends packets of the call and the mobile station specified by the control unit 132 to the buffer 133. The output timing generation circuit 131 generates the output timing according to an output timing interval specified from the control unit 132, and specifies the output timing for outputting the stored packets to the buffer 133. Here, the control unit 132 specifies the call number and the mobile station ID to the packet selection circuit 130a, while specifying the output timing interval to the output timing generation circuit 131.

Then, the buffer 133 outputs the stored packets to the packet selection and composition circuit 134 in an order of the sequence numbers at the output timing specified from the output timing generation circuit 131. Here, in a case a plurality of packets having an identical sequence number are stored in the buffer 133, the buffer 133 outputs all these plurality of packets to the packet selection and composition circuit 134. When a plurality of packets with the identical sequence number are entered from the buffer 133, the packet selection and composition circuit 134 selects the packet with the highest reliability among them according to the reliability information attached to each packet, and outputs that selected packet to the other base station or mobile station. Here, the reliability information attached to each packet by the reliability information attaching circuit 122 is usually deleted by a reliability information deletion means (not shown) provided within the packet selection and composition circuit 134 before the packet is outputted from the exchange station 150.

The various identification information to be attached to each packet in the mobile communication system of this second embodiment will now be described in further detail.

Figure 10A:
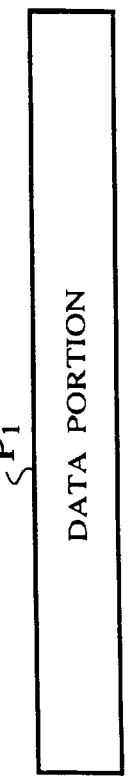
FIGS. 10A to 10E are diagrammatic illustrations of a form of packet obtained at various elements in the mobile station of FIG. 8 and the base station side sub-system of FIG. 9.

FIG. 10A shows a packet obtained as an output of the packet generation circuit 101 in the mobile station 100 of FIG. 8, which comprises a data portion Pi alone.

Figure 10B:
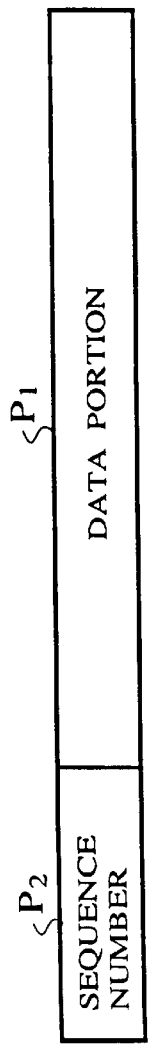

FIG. 10B shows a packet obtained as an output of the sequence number attaching circuit 102 in the mobile station 100 of FIG. 8, which comprises the data portion $P_1$ and a sequence number $P_2$ attached in front of the data portion $P_1$.

Figure 10C:
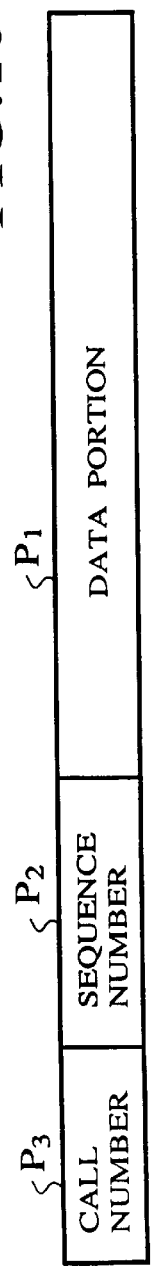

FIG. 10C shows a packet obtained as an output of the call number attaching circuit 103 in the mobile station 100 of FIG. 8, which comprises the data portion $P_1$, the sequence number $P_2$, and a call number $P_3$ attached in front of the sequence number $P_2$.

Figure 10D:
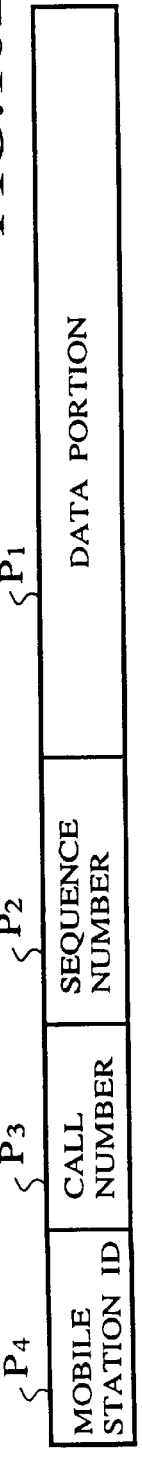

FIG. 10D shows a packet obtained as an output of the mobile station ID attaching circuit 104 in the mobile station 100 of FIG. 8, which comprises the data portion $P_1$, the sequence number $P_2$, the call number $P_3$, and a mobile station ID $P_4$ attached in front of the call number $P_3$.

Figure 10E:
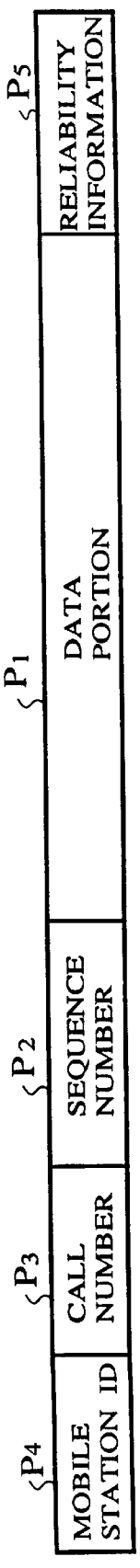

FIG. 10E shows a packet obtained as an output of the reliability information attaching circuit 122 in each base station 120 of FIG. 9, which comprises the data portion $P_1$, the sequence number $P_2$, the call number $P_3$, the mobile station ID $P_4$, and a reliability information $P_5$ attached behind the data portion $P_1$.

Now, an overall operation for a signal transmission from the signal transmission section of the mobile station 100 as shown in FIG. 8 to the signal reception section of the base station side sub-system as shown in FIG. 9 described above will now be described for an exemplary case of forming packets from entered data, and transmitting packets in multiplexed form.

In this case, at the mobile station 100, the speech/data entered into the mobile station 100 are put into forms of packets by the packet generation circuit 101, and the sequence number, the call number, and the mobile station ID are attached by the sequence number attaching circuit 102, the call number attaching circuit 103, and the mobile station ID attaching circuit 104, respectively, and then transmitted through the transmission unit 106.

Then, the packets transmitted from the mobile station 100 are received by a plurality of base stations 120a and 120b. The operation of the first base station 120a is substantially the same as that of the second base station 120b, so that only the operation of the first base station 120a will be described here. The packets transmitted from the mobile station 100 are received, demodulated, and decoded by the reception circuit 121 of the first base station 120a and outputted in a packet configuration as shown in FIG. 10D. Also, in synchronization with that, the reliability information for each received packet is measured and outputted. At the reliability information attaching circuit 122, the reliability information corresponding to each packet is attached to each packet, and then each packet is outputted in a packet configuration as shown in FIG. 10E to the exchange station 150.

Then, at the packet selection circuit 130a in the exchange station 150, the packets corresponding to the call number and the mobile station ID as specified from the control unit 132 are sent to the buffer 133. The control unit 132 also specifies the output timing interval to the output timing generation circuit 131, such that the output timing generation circuit 131 generates the output timing according to the specified output timing interval, and specifies the output timing for outputting the stored packets to the buffer 133.

The buffer 133 sends the stored packets to the packet selection and composition circuit 134 in an order of the sequence numbers at the output timing specified from the output timing generation circuit 131. When a plurality of packets having an identical sequence number are stored, all these plurality of packets are sent to the packet selection and composition circuit 134. In this manner, the timing of the packets from the first base station 120a is synchronized with the timing of the packets from the second base station 120b which is simultaneously connected.

The packets from all the base stations 120 are entered into the packet selection and composition circuit 134, and when a plurality of packets with the identical sequence number are entered due to the simultaneous connection of a plurality of the base stations 120, the packet selection and composition circuit 134 selectively outputs the packet with the highest reliability among these plurality of packets according to the reliability information attached to each packet.

Figure 11:
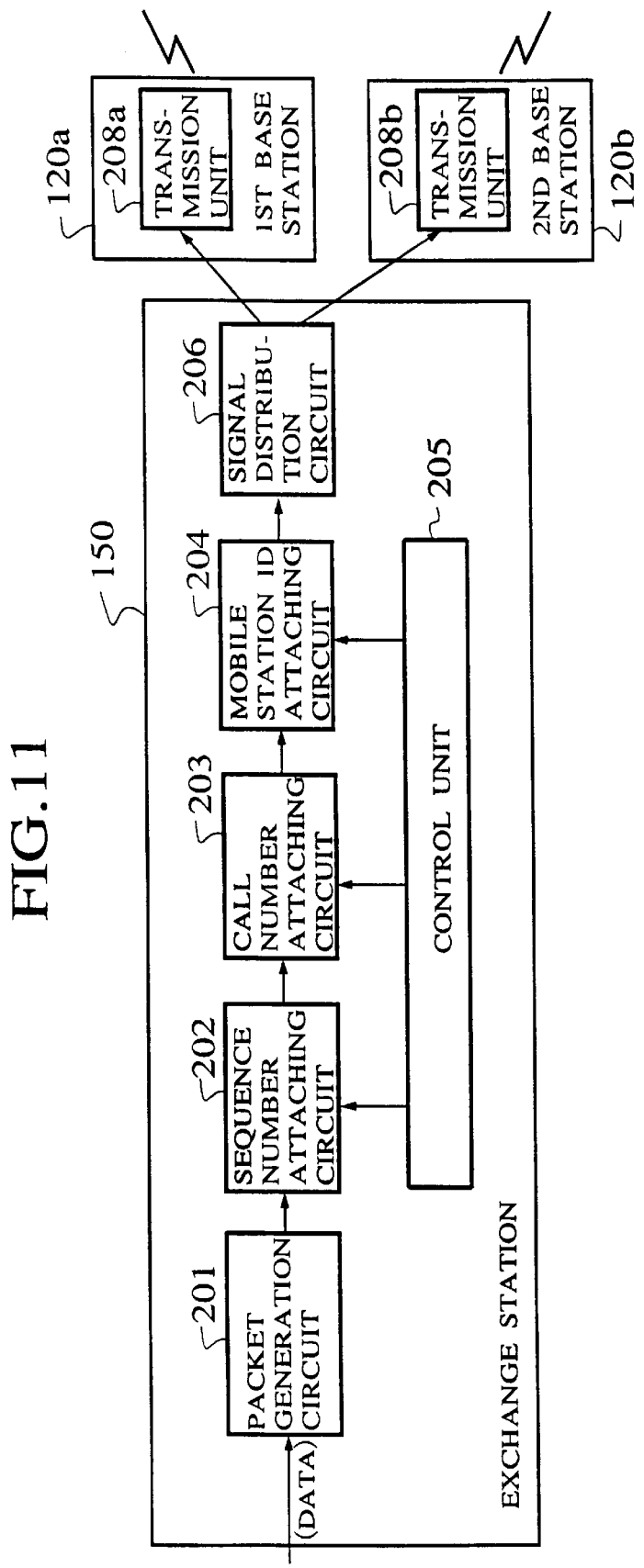
FIG. 11 is a block diagram of a detailed configuration for a signal transmission section of a base station side sub-system in the mobile communication system of FIG. 7.

Next, the base station side sub-system including a plurality of base stations 120a and 120b and the exchange station 150 has a partial configuration related to the signal transmission to the mobile station as shown in FIG. 11.

Namely, a signal transmission section of the exchange station 150 comprises a packet generation circuit 201, a sequence number attaching circuit 202, a call number attaching circuit 203, a mobile station ID attaching circuit 204, and a signal distribution circuit 206, which are connected in series in this order, and a control unit 205 connected with the sequence number attaching circuit 202, the call number attaching circuit 203, and the mobile station ID attaching circuit 204, where the data to be transmitted are entered into the packet generation circuit 201 and outputted from the signal distribution circuit 206.

Also, as a signal transmission section, the base stations 120a and 120b have transmission units 208a and 208b, respectively, for transmitting the packets supplied from the signal distribution circuit 206 of the exchange station 150 to the mobile station 100.

The signal transmission operation by the signal transmission section of the exchange station 150 will now be described for an exemplary case of forming packets from entered data, and transmitting packets in multiplexed form.

First, the packet generation circuit 201 divides the entered data into packets of predetermined length, and outputs the obtained packets to the sequence number attaching circuit 202.

Then, the sequence number attaching circuit 202 attaches a sequence number indicating an order among these entered packets to each of the entered packets. Here, the sequence number is set to be an ordered number which is increased by one for each newly entered packet, and reset to 0 whenever it reaches a predetermined value. Next, to each of the entered packets, the call number attaching circuit 203 attaches a call number which is used as an identifier in making a call identification for each packet at the mobile station side in a case the mobile station 100 deals with a plurality of calls. Then, to each of the entered packets, the mobile station ID attaching circuit 204 attaches a mobile station ID of a target mobile station.

Here, the control unit 205 provides control signals for controlling the above described operations to attach the sequence number, the call number, and the mobile station ID, to the sequence number attaching circuit 202, the call number attaching circuit 203, and the mobile station ID attaching circuit 204.

Then, the signal distribution circuit 206 distributes the same packets to all the base stations 120 which are simultaneously connected. In a case of FIG. 11, the first base station 120a and the second base station 120b are simultaneously connected with the exchange station 150. Each of the transmission units 208a and 208b in the first and second base stations 120a and 120b applies the data packet encoding and modulation processing to make the entered packets suitable for the radio transmission, and transmits the resulting packets to the mobile station.

Figure 12:
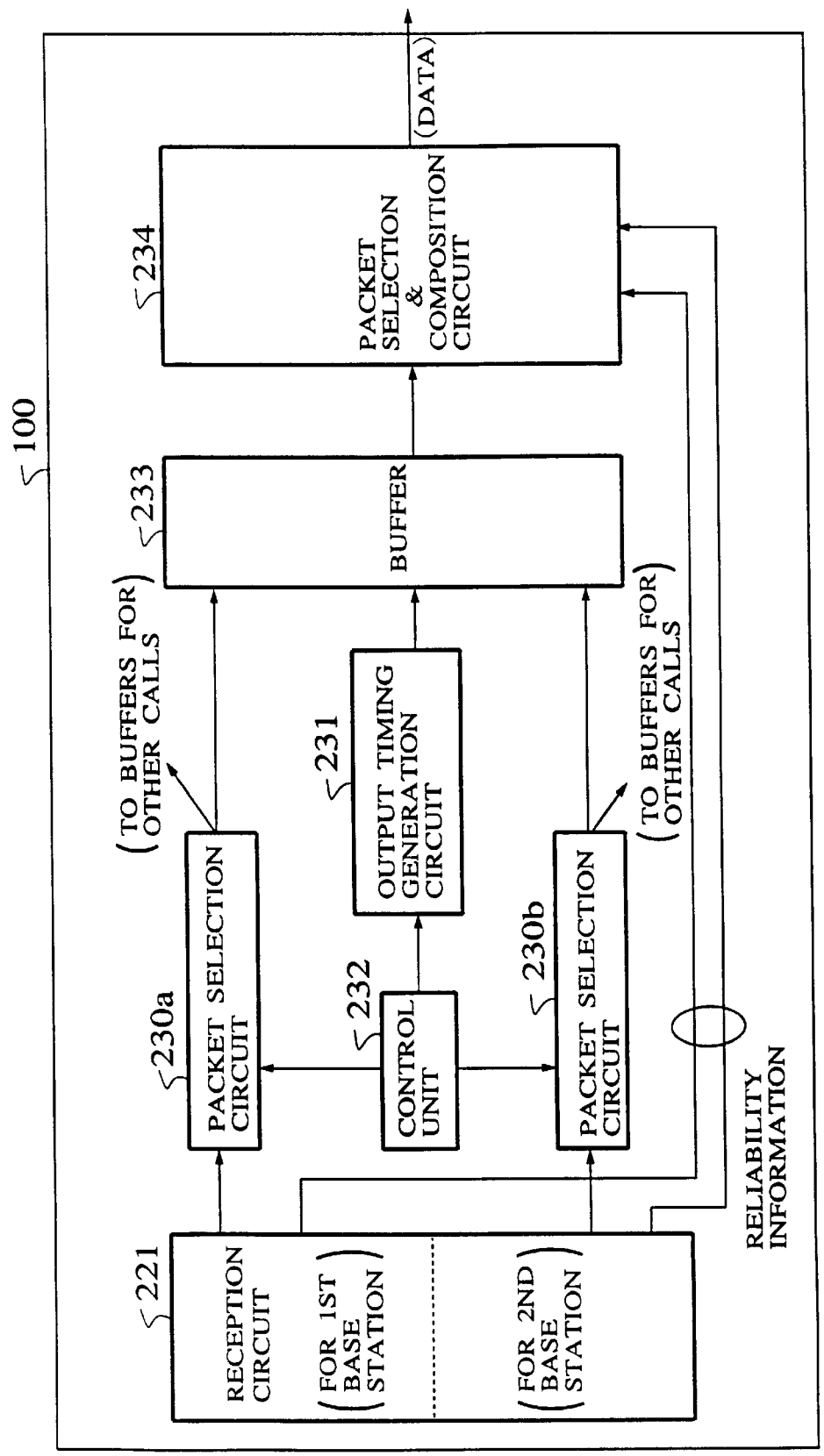
FIG. 12 is a block diagram of a detailed configuration for a signal reception section of a mobile station in the mobile communication system of FIG. 7.

On the other hand, the mobile station 100 has a partial configuration related to the signal reception from the base stations as shown in FIG. 12.

Namely, a signal reception section of the mobile station 100 includes a reception circuit 221 having a plurality of reception units in correspondence to a plurality of base stations 120a and 120b, a plurality of packet selection circuits 230a and 230b provided in correspondence to a plurality of base stations 120a and 120b, which are connected to a buffer 233 for each call, as well as other buffers (not shown) for other calls which are similar to the buffer 233, and a control unit 232 connected with the packet selection circuits 230a and 230b as well as an output timing generation circuit 231 which is also connected with the buffer 233. The output of the buffer 233 is connected with a packet selection and composition circuit 234 for outputting received data packets. The packets from a plurality of base stations 120a and 120b received by the reception circuit 221 are supplied to the corresponding packet selection circuits 230a and 230b, while the reliability information for the packets from a plurality of base stations 120a and 120b measured by a reliability information measurement means (not shown) provided within the reception circuit 221 are supplied to the packet selection and composition circuit 234.

This signal reception section of the mobile station 100 operates as follows.

First, the reception circuit 221 receives the packets from the base stations 120a and 120b, and outputs the packets from the base stations 120a and 120b separately to the corresponding packet selection circuits 230a and 230b. Also, the reliability information for each packet from the base stations is measured and outputted to the packet selection and composition circuit 234 in correspondence to each packet.

The packet selection circuits 230a and 230b send packets of each call with respect to this mobile station 100 specified by the control unit 232 to the buffer 233. The output timing generation circuit 231 generates the output timing according to an output timing interval specified from the control unit 232, and specifies the output timing for outputting the stored packets to the buffer 233. Here, the control unit 232 specifies the call number and the mobile station ID to the packet selection circuits 230a and 230b, while specifying the output timing interval to the output timing generation circuit 231.

Then, the buffer 233 outputs the stored packets to the packet selection and composition circuit 234 in an order of the sequence numbers at the output timing specified from the output timing generation circuit 231. Here, in a case a plurality of packets having an identical sequence number are stored in the buffer 233, the buffer 233 outputs all these plurality of packets to the packet selection and composition circuit 234. When a plurality of packets with the identical sequence number are entered from the buffer 233, the packet selection and composition circuit 234 selectively outputs the packet with the highest reliability among them according to the reliability information corresponding to each packet.

Now, an overall operation for a signal transmission from the signal transmission section of the base station side sub-system as shown in FIG. 11 to the signal reception section of the mobile station 100 as shown in FIG. 12 described above will now be described for an exemplary case of forming packets from entered data, and transmitting packets in multiplexed form.

In this case, at the exchange station 150, the speech/data entered from the network side into the exchange station 150 are put into forms of packets by the packet generation circuit 201, and the sequence number, the call number, and the mobile station ID are attached by the sequence number attaching circuit 202, the call number attaching circuit 203, and the mobile station ID attaching circuit 204, respectively, and distributed by the signal distribution circuit 206 to all the base stations 120 which are simultaneously connected. At each base station 120, the entered packets are transmitted by the transmission unit 208 to the mobile station 100.

Then, the packets transmitted from the base stations 120 are received, demodulated and decoded by the reception circuit 221 of the mobile station 100, and the packets from the first base station 120a and the packets from the second base station 120b are outputted separately. In synchronization with that, the reliability information for each received packet is measured and outputted to the packet selection and composition circuit 234.

Then, at the packet selection circuits 230a and 230b in the mobile station 100, the packets corresponding to the call number for this mobile station 100 as specified from the control unit 232 are sent to the buffer 233. The unit 232 also specifies the output timing interval to the output timing generation circuit 231, such that the output timing generation circuit 231 generates the output timing according to the specified output timing interval, and specifies the output timing for outputting the stored packets to the buffer 233.

The buffer 233 sends the stored packets to the packet selection and composition circuit 234 in an order of the sequence numbers at the output timing specified from the output timing generation circuit 231. When a plurality of packets having an identical sequence number are stored, all these plurality of packets are sent to the packet selection and composition circuit 234.

The packets from all the base stations 120 are entered into the packet selection and composition circuit 234, and when a plurality of packets with the identical sequence number are entered due to the simultaneous connection of a plurality of the base stations 120, the packet selection and composition circuit 234 selectively outputs the packet with the highest reliability among these plurality of packets according to the reliability information corresponding to each packet supplied from the reception circuit 221.

In this second embodiment, the reliability information for each packet can be any quantity which indicates the signal transmission quality, such as a reception level, a signal to interference ratio (SIR), an error detection code, etc. As for the measurement of this reliability information, the detail of the method for measuring the reception level as well as the detail of the method for measuring the SIR can also be found in the aforementioned Japanese Patent Application No. 5-49318 (1993).

In a case of using the error detection code, each predetermined block is error detection encoded in advance, and the error detection for each block is carried out at the receiving side by the error detection decoding. Here, the packet selection and composition circuits 134 and 234 are made to select the packet for which no error is detected as much as possible. When a plurality of packets without any error exist, or when some errors are detected for all the packets, the packet with the highest reliability according to the other reliability information such as the reception level or the SIR is selected. The measurement of the reliability information in this case is made in unit of a block in which a part of the received transmission symbols in the packet or a plurality of received transmission symbols are grouped together. It is also possible to use an average value of the measured value for each symbol or each block over the packet length as the reliability information for each packet, if desired.

It is to be noted that, although this second embodiment has been described for an exemplary case of the packet communication, the present invention is equally applicable to the other types of communication, such as a scheme for transmitting data in forms of blocks (cells, frames, etc.) of fixed or arbitrary length, examples of which include a circuit exchange scheme, a packet exchange scheme, and an ATM (Asynchronous Transfer Mode) scheme.

Also, this second embodiment has been described for an exemplary system using the exchange station 150 in a configuration of FIGS. 9 and 11, but the functions of this exchange station 150 may not necessarily be a part of the exchange station in general, and can be provided in a form of any upper side device of each base station other than the exchange station.

As described, according to this second embodiment, by attaching various identification information such as the sequence number, the call number, and the mobile station ID to each packet signal, and making the order control of the packet signals according to the identification information, it is possible to prevent the partial dropping or the unnecessary repetition of the transmitted packet signals, even when the channel for transmitting the packets is changed or when the transmission paths are asynchronous, so that a highly reliable diversity handover scheme in the packet communication can be realized. Also, by recognizing a plurality of identical packet signals from a plurality of base stations according to the identification information, and selecting the best packet signal among them according to the corresponding reliability information, it is possible to realize a high quality packet transmission.

It is to be noted here that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A method of handover for a mobile communication in a mobile communication system formed by at least one mobile station, and a plurality of base stations, the method comprising the steps of:

transmitting downward communication signals containing identical communication data simultaneously from more than one base stations to the mobile station, at a time of a handover to change a base station used for a communication with the mobile station among said plurality of base stations;

measuring at the mobile station a reliability information indicating a reliability of the downward communication signals received from each base station, the reliability information being a signal to interference ratio of the downward communication signals received from each base station; and composing downward reception signals at the mobile station from the downward communication signals received from said more than one base stations, according to the reliability information measured for the downward communication signals received from said more than one base stations.

2. The method of claim 1, wherein the reliability information is measured at the mobile station in unit of each transmission symbol/bit in the downward communication signals received from each base station.

3. The method of claim 1, wherein the reliability information is measured at the mobile station in unit of each block formed by a plurality of transmission symbols/bits in the downward communication signals received from each base station.

4. A mobile station device for a mobile communication system formed by at least one mobile station, and a plurality of base stations, the mobile station device comprising:

means for transmitting upward communication signals containing identical communication data simultaneously to more than one base stations, at a time of a handover to change a base station used for a communication with the mobile station among said plurality of base stations;

means for receiving downward communication signals from the base stations;

means for measuring a reliability information indicating a reliability of the downward communication signals received from each base station, the reliability information being a signal to interference ratio of the downward communication signals received from each base station; and means for composing downward reception signals from the downward communication signals received from said more than one base stations at a time of the handover, according to the reliability information measured for the downward communication signals received from said more than one base stations.

5. The mobile station device of claim 4, wherein the measuring means measures the reliability information in unit of each transmission symbol/bit in the downward communication signals received from each base station.

6. The mobile station device of claim 4, wherein the measuring means measures the reliability information in unit of each block formed by a plurality of transmission symbols/bits in the downward communication signals received from each base station.

7. A method of mobile communication in a mobile communication system formed by at least one mobile station, a plurality of base stations, and an upper device connected with the base stations, the method comprising the steps of:

(a) at the mobile station, generating packets from communication data to be transmitted, attaching identification information for identifying each packet to the generated packets, and transmitting the packets with the identification information to the base stations;

(b) at each base station, receiving the packets from the mobile station, measuring a reliability information indicating a reliability of each packet received at each base station, attaching the reliability information to each packet received at each base station, and transmitting the packets with the reliability information to the upper device; and (c) at the upper device, processing the packets received from the mobile station through the base stations, according to the identification information and the reliability information attached to each packet.

8. The method of claim 7, wherein at the step (a), the mobile station transmits packets containing identical communication data simultaneously to more than one base stations at a time of a handover to change a base station used for a communication with the mobile station among said plurality of base stations, and at the step (c), the upper device composes reception packets from the packets received at said more than one base stations according to the identification information and the reliability information attached to each packet.

9. The method of claim 7, wherein at the step (a), the identification information attached to each packet by the mobile station includes at least one of a sequence number for identifying an order of each packet among the generated packets, a call number for identifying a call to which each packet belongs, and a mobile station ID for identifying a mobile station from which each packet is transmitted.

10. The method of claim 7, wherein at the step (b), the reliability information measured at each base station is at least one of a reception level, a signal to interference ratio, and an error detection code of each packet received at each base station.

11. A method of mobile communication in a mobile communication system formed by at least one mobile station, a plurality of base stations, and an upper device connected with the base stations, the method comprising the steps of:

(a) at the upper device, generating packets from communication data to be transmitted, attaching identification information for identifying each packet to the generated packets, and transmitting the packets with the identification information to the mobile station through the base stations; and (b) at the mobile station, receiving the packets from the upper device through the base stations, measuring a reliability information indicating a reliability of each packet received from each base station, and composing reception packets from the packets received from the base stations, according to the identification information attached to each packet and the reliability information measured for each packet.

12. The method of claim 11, wherein at the step (a), the upper device transmits packets containing identical communication data simultaneously to the mobile station through more than one base stations at a time of a handover to change a base station used for a communication with the mobile station among said plurality of base stations, and at the step (b), the mobile station composes the reception packets from the packets received from said more than one base stations according to the identification information attached to each packet and the reliability information measured for each packet.

13. The method of claim 11, wherein at the step (a), the identification information attached to each packet by the upper device includes at least one of a sequence number for identifying an order of each packet among the generated packets, a call number for identifying a call to which each packet belongs, and a mobile station ID for identifying a mobile station to which each packet is transmitted.

14. The method of claim 11, wherein at the step (b), the reliability information measured at the mobile station is at least one of a reception level, a signal to interference ratio, and an error detection code of each packet received from each base station.

15. A mobile station device for a mobile communication system formed by at least one mobile station, a plurality of base stations, and an upper device connected with the base stations, the mobile station device comprising:

means for generating packets from communication data to be transmitted;

means for attaching identification information for identifying each packet to each of the packets generated by the generating means; and means for transmitting the packets with the identification information attached by the attaching means to the upper device through the base stations.

16. The mobile station device of claim 15, wherein the identification information attached to each packet by the attaching means includes at least one of a sequence number for identifying an order of each packet among the generated packets, a call number for identifying a call to which each packet belongs, and a mobile station ID for identifying a mobile station from which each packet is transmitted.

17. The mobile station device of claim 15, wherein the transmitting means transmits packets containing identical communication data simultaneously to the upper device through more than one base stations, at a time of a handover to change a base station used for a communication with the mobile station among said plurality of base stations.

18. The mobile station device of claim 15, further comprising:

means for receiving packets containing identical communication data simultaneously from more than one base stations, at a time of a handover to change a base station used for a communication with the mobile station among said plurality of base stations;

means for measuring a reliability information indicating a reliability of each packet received from each base station; and means for composing reception packets from the packets received from said more than one base stations according to the identification information attached to each packet and the reliability information measured for each packet.

19. The mobile station device of claim 18, wherein the reliability information measured by the measuring means is at least one of a reception level, a signal to interference ratio, and an error detection code of each packet received from each base station.

20. A base station side sub-system device for a mobile communication system formed by at least one mobile station, a plurality of base stations, and an upper device connected with the base stations, the base station side sub-system device comprising:

means for generating packets from communication data to be transmitted;

means for attaching identification information for identifying each packet to each of the packets generated by the generating means;

means for transmitting the packets with the identification information attached by the attaching means from the upper device to the mobile station through the base stations;

means for receiving packets containing identical communication data simultaneously at more than one base stations, at a time of a handover to change a base station used for a communication with the mobile station among said plurality of base stations, each received packet having identification information attached thereto by the mobile station;

means for measuring a reliability information indicating a reliability of each received packet received at each base station; and means for composing reception packets from the packets received at said more than one base stations according to the identification information attached to each received packet and the reliability information measured for each received packet.

21. The base station side sub-system device of claim 20, wherein the identification information attached to each packet by the attaching means includes at least one of a sequence number for identifying an order of each packet among the generated packets, a call number for identifying a call to which each packet belongs, and a mobile station ID for identifying a mobile station to which each packet is transmitted.

22. The base station side sub-system device of claim 20, wherein the transmitting means transmits packets containing identical communication data simultaneously from the upper device through more than one base stations, at a time of a handover to change a base station used for a communication with the mobile station among said plurality of base stations.

23. The base station side sub-system device of claim 20, wherein the reliability information measured by the measuring means is at least one of a reception level, a signal to interference ratio, and an error detection code of each packet received at each base station.

* * * * *